United States Patent
Dhaka et al.

(10) Patent No.: US 11,704,164 B1
(45) Date of Patent: *Jul. 18, 2023

(54) INTELLIGENT AND AUTOMATIC LOAD BALANCING OF WORKLOADS ON REPLICATION APPLIANCES BASED ON APPLIANCE LOAD SCORES

(71) Applicant: Veritas Technologies LLC, Santa Clara, CA (US)

(72) Inventors: Pramila Dhaka, Pune (IN); Parikshit Hooda, Rohtak (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/117,796

(22) Filed: Dec. 10, 2020

Related U.S. Application Data

(63) Continuation of application No. 16/119,732, filed on Aug. 31, 2018, now Pat. No. 10,884,820.

(51) Int. Cl.
*G06F 16/00* (2019.01)
*G06F 11/00* (2006.01)
(Continued)

(52) U.S. Cl.
CPC .......... *G06F 9/5083* (2013.01); *G06F 3/065* (2013.01); *G06F 3/067* (2013.01); *G06F 3/0619* (2013.01);
(Continued)

(58) Field of Classification Search
CPC .. G06F 9/505; G06F 11/2097; G06F 11/1666; G06F 11/3485; G06F 11/26;
(Continued)

(56) References Cited

U.S. PATENT DOCUMENTS

| 6,557,079 B1 | 4/2003 | Mason, Jr. et al. |
| 9,075,771 B1 * | 7/2015 | Gawali ............... G06F 11/2028 |

(Continued)

FOREIGN PATENT DOCUMENTS

| WO | WO2003069437 A2 * | 8/2003 |
| WO | WO2012177445 A2 * | 12/2012 |
| WO | WO2015127308 A1 * | 8/2015 |

OTHER PUBLICATIONS

Moise W. Convolbo et al., "DRASH: A Data Replication-Aware Scheduler in Geo-Distributed Data Centers", 2016 IEEE International Conference on Cloud Computing Technology and Science (CloudCom), Dec. 2016, pp.*

(Continued)

*Primary Examiner* — Srirama Channavajjala
(74) *Attorney, Agent, or Firm* — Womble Bond Dickinson (US) LLP

(57) ABSTRACT

Various systems and methods are provided in which a replication process is initiated between a primary site and a recovery site, each having plurality of gateway appliances. Replication loads are evaluated for each given gateway appliance of the plurality of gateway appliances. If a determination is made that at least one gateway appliance of the plurality of gateway appliances is not overloaded, the plurality of gateway appliances are sorted based on replication loads respectively associated with each gateway appliance, and a determination is made as to whether a relative difference in replication loads between a gateway appliance having a highest replication load and a gateway appliance having a lowest replication load exceeds a difference threshold to determine whether the replication workloads between the gateway appliances should be rebalanced.

20 Claims, 9 Drawing Sheets

(51) Int. Cl.
*G06F 9/50* (2006.01)
*G06F 3/06* (2006.01)
*G06F 9/48* (2006.01)
*G06F 16/27* (2019.01)
*G06F 16/182* (2019.01)
*H04L 67/1095* (2022.01)
*G06F 11/14* (2006.01)
*G06Q 10/06* (2023.01)
*G06F 9/455* (2018.01)

(52) U.S. Cl.
CPC ........ *G06F 9/45558* (2013.01); *G06F 9/4868* (2013.01); *G06F 9/505* (2013.01); *G06F 11/1448* (2013.01); *G06F 11/1458* (2013.01); *G06F 11/1469* (2013.01); *G06F 11/1492* (2013.01); *G06F 16/184* (2019.01); *G06F 16/1844* (2019.01); *G06F 16/27* (2019.01); *G06Q 10/06* (2013.01); *H04L 67/1095* (2013.01); *G06F 2009/4557* (2013.01); *G06F 2009/45595* (2013.01)

(58) Field of Classification Search
CPC ............. G06F 11/2358; G06F 11/2069; G06F 11/004; G06F 16/27; G06F 16/178; G06F 16/119; G06F 16/188; G06F 16/1865; G06F 16/273; G06F 16/275; G06F 9/5083; G06F 9/4868; G06F 9/45558; G06F 16/184; G06F 11/1492; G06F 11/1469; G06F 11/1458; G06F 11/1448
See application file for complete search history.

(56) References Cited

U.S. PATENT DOCUMENTS

| | | | |
|---|---|---|---|
| 9,514,180 B1 | 12/2016 | Cadarette et al. | |
| 9,552,405 B1* | 1/2017 | Moore | G06F 16/27 |
| 10,007,695 B1* | 6/2018 | Baid | G06F 16/27 |
| 10,623,488 B1* | 4/2020 | Ghemawat | H04L 67/1095 |
| 2007/0185973 A1 | 8/2007 | Wayda et al. | |
| 2010/0106934 A1* | 4/2010 | Calder | G06F 3/0644 |
| | | | 707/E17.014 |
| 2011/0099146 A1 | 4/2011 | McAlister et al. | |
| 2012/0233123 A1 | 9/2012 | Shisheng et al. | |
| 2012/0259968 A1 | 10/2012 | Anaya et al. | |
| 2012/0303791 A1* | 11/2012 | Calder | G06F 9/5083 |
| | | | 709/224 |
| 2014/0033201 A1* | 1/2014 | Dawkins | G06F 9/45558 |
| | | | 718/1 |
| 2014/0040206 A1 | 2/2014 | Ramakrishnan et al. | |
| 2014/0351644 A1 | 11/2014 | Garg et al. | |
| 2014/0372800 A1 | 12/2014 | Garza et al. | |
| 2015/0019491 A1* | 1/2015 | Hunt | G06F 16/178 |
| | | | 707/639 |
| 2016/0026535 A1 | 1/2016 | Bhat et al. | |
| 2016/0239396 A1 | 8/2016 | Deng et al. | |
| 2017/0060975 A1* | 3/2017 | Akyureklier | G06F 11/2097 |
| 2017/0351591 A1 | 12/2017 | Crawford et al. | |

OTHER PUBLICATIONS

Valentin Pupezescu et al., "The influence of data replication in the knowledge discovery in distributed databases process", 2016 8th International Conference on Electronics, Computers and Artificial Intelligence (ECAI), Jul. 2016, pp. 1-6.*

* cited by examiner

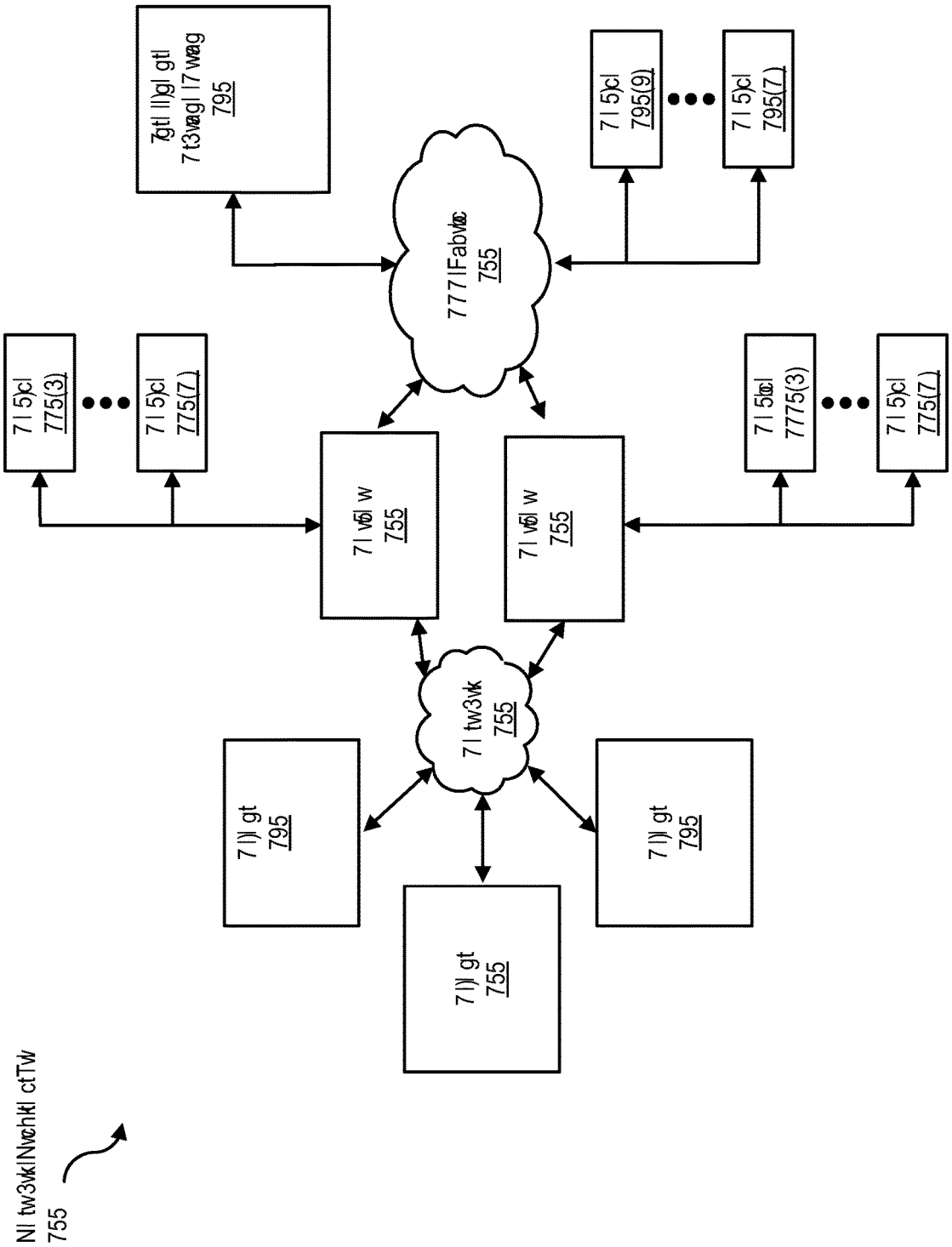

INTELLIGENT AND AUTOMATIC LOAD BALANCING OF WORKLOADS ON REPLICATION APPLIANCES BASED ON APPLIANCE LOAD SCORES

CROSS-REFERENCE TO RELATED APPLICATIONS

The present patent application is a continuation of U.S. patent application Ser. No. 16/119,732, filed on Aug. 31, 2018, entitled "Intelligent and Automatic Replication Load Score Based Load Balancing and Resiliency of Replication Appliances," which is incorporated by reference herein in their entirety and for all purposes.

BACKGROUND OF THE INVENTION

Field of the Invention

This disclosure generally relates to the efficient replication of data among computing systems, and more specifically to intelligent and automatic load balancing of workloads on replication appliances based on appliance load scores.

State of the Technology

Data can be replicated from a primary site to a recovery site by using virtual appliances. Such virtual appliances can be used to facilitate the replication of data that is being written by a virtual machine on the primary site. Virtual appliances on a recovery site can then be used to store the replicated data in a datastore or other location on the recovery site. However, such systems do not always scale well, and can lead to inefficiencies or data loss when problems occur within a system.

SUMMARY OF THE DISCLOSURE

The disclosure generally includes methods, computer program products, computer systems, and the like, that provide for load balancing and resiliency with respect to the replication of data between two or more computing systems, such as may occur, for example, in a cloud computing environment. In one embodiment, the functionality disclosed herein includes initiating a replication process between a primary site and a recovery site, where the recovery site may include a plurality of gateway appliances. The functionality also includes evaluating replication loads for the plurality of gateway appliances, where the evaluating of the replication load for each given gateway appliance includes analyzing at least a first evaluation factor for the given gateway appliance and a second evaluation factor for the given gateway appliance. In certain embodiments, the first evaluation factor for the given gateway appliance and the second evaluation factor for the given gateway appliance are both related to the replication load of the replication process on the given gateway appliance. Certain embodiments make a determination as to whether at least one gateway appliance of the plurality of gateway appliances is not overloaded. In response to determining that at least one gateway appliance of the plurality of gateway appliances is not overloaded, the plurality of gateway appliances are sorted based on replication loads respectively associated with each gateway appliance, and a determination is made as to whether a relative difference in replication loads between a gateway appliance having a highest replication load and a gateway appliance having a lowest replication load exceeds a difference threshold. If it is determined that the relative difference in replication load exceeds the difference threshold, replication workloads between the plurality of gateway appliances is rebalanced. Other embodiments of this aspect include corresponding computer systems, apparatus, and computer programs recorded on one or more computer storage devices, each configured to perform the actions of the methods.

In certain embodiments, the functionality includes determining whether any gateway appliances of the plurality of gateway appliances has faulted. In response to determining that a gateway appliance has faulted, replication workloads between gateway appliances of the plurality of gateway appliances that are online are rebalanced, and/or one or more additional gateway appliances is brought on line as part of the plurality of gateway appliances.

In certain embodiments, the first weight of the first evaluation factor of the given gateway appliance is greater than the second weight of the second evaluation factor of the given gateway appliance. In certain embodiments, at least one of the first evaluation factor and the second evaluation factor pertains to setting up a replication environment between a primary site and a recovery site, and beginning replication between those sites.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

FIG. 7 is a block diagram of a networked system, illustrating how various computing devices can communicate via a network, according to one embodiment of the present disclosure.

Figure 1A:
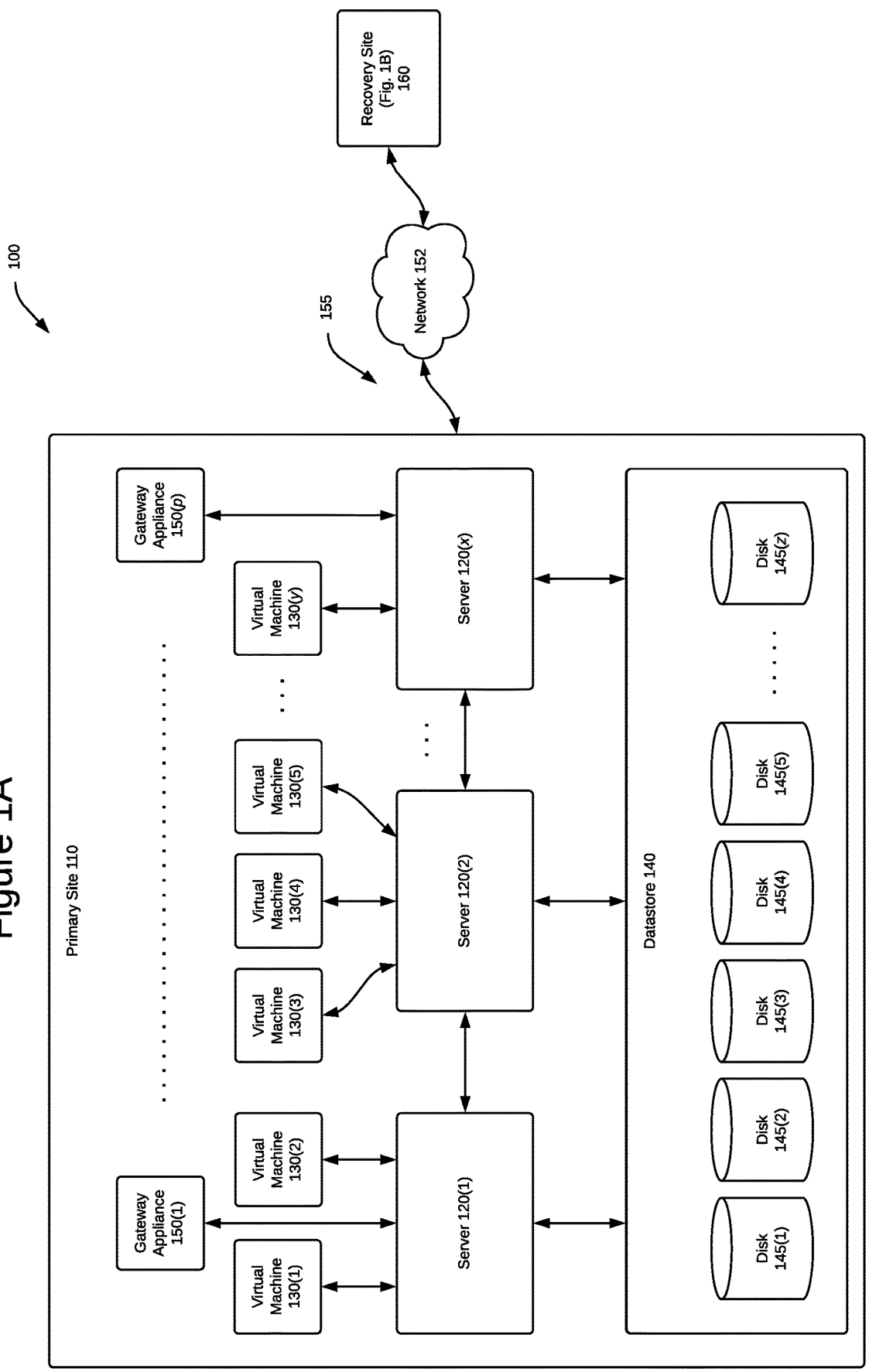
FIG. 1A is a block diagram depicting an example computing environment, and particularly an example primary site and the connections thereto, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

Data can be replicated from a primary site to a recovery site by using virtual appliances (in addition to other components, of course). Such virtual machines are used to facilitate the replication of data that is being written by a virtual machine on the primary site. This replication process includes "tapping" or otherwise intercepting data being written on the primary site, and then transmitting that data to an associated appliance on a recovery site. The appliance on the recovery site then stores the replicated data in a datastore or other location on the recovery site. The original data is stored in a separate datastore, which is part of the primary site. Moreover, each datastore can include multiple disks.

In many replication environments, however, there is an upper limit to the number of disks that can be associated with each virtual appliance. For instance, as one example, there may be a limit of 26 disks per appliance in one embodiment. In other embodiments, there can be a different maximum number of disks that can be associated with each virtual appliance. But regardless of the exact maximum number of disks that can be associated with each appliance, when the number of disks on the primary site exceeds that maximum number of disks that can be associated with each appliance, then additional appliances are needed on both sites to handle the data. For instance, if the maximum number of disks per appliance is 26, and the primary site has 52 disks, then two appliances would be needed on each site to accommodate those 52 disks. Similarly, if the maximum number of disks per appliance is 26, and the primary site has 78 disks, then three appliances would be needed on each site to accommodate those 78 disks. As such, the number of appliances that are needed to handle the disks would continue to increase as the associated systems continue to grow.

While this functionality provides some benefits, such as the ability to scale, it also creates some problems. For instance, if multiple appliances are needed in the cloud, then the workload should be balanced between those cloud appliances during the replication process. This is needed because replication will be delayed if any of the appliances become overloaded. (Of course, even a single appliance could become overloaded, but when multiple appliances are being used then it becomes possible to balance the workload between those appliances, particularly if one or more of the other appliances have extra bandwidth available.) The foregoing is true with respect to the appliances on a primary site as well as the appliances on a recovery site. That is, if multiple appliances are being used on the primary site, then the workload should be balanced between those primary site appliances during the replication process. And if multiple appliances are being used on the recovery site, then the workload should be balanced between those recovery site appliances during the replication process. However, when setting up a system such as is described herein, a user does not typically know in advance which appliances will become overloaded, or when that overloading will occur. This is due, at least in part, to the fact that the load on appliances will change and vary throughout operation. Additionally, one or more of the appliances may fail (or otherwise be disconnected, taken offline, or stop operating properly). The failure of an appliance results in downtime (at a minimum), and could even result in data loss, such as if a disaster occurs during that downtime. Obviously, a user also cannot know in advance which appliance(s) will fail, or when any such failures will occur. Thus, there exists a need to be able to dynamically and efficiently rebalance the overall workload between the remaining appliances in either of these situations, and to dynamically and efficiently provide data resiliency in the event of a failure, among other possible scenarios in which the systems and methods disclosed herein may be useful.

The disclosure generally includes methods, computer program products, computer systems, and the like, that provide for load balancing and resiliency with respect to the replication of data between two or more computing systems, such as may occur, for example, in a cloud computing environment. In one embodiment, the functionality disclosed herein includes setting up a replication environment between a primary site and a recovery site, and beginning replication between those sites. The functionality disclosed herein can then be used to evaluate the replication load of the appliances on either the primary site and/or the replication site, and take appropriate action to dynamically rebalance the workloads of any appliances that are either overloaded or underloaded. The functionality disclosed herein can also be used to dynamically reallocate the workload of any appliance that fails or which is otherwise taken offline. The foregoing rebalancing and reallocating can be optimally and dynamically performed by evaluating various real-time and/or historical factors, such as those described in more detail herein, thereby reducing inefficiencies in the case of overloaded appliances, and eliminating the possibility of data loss when one or more appliances fail, are faulted, or are otherwise taken offline. This functionally will be discussed further in conjunction with the discussion of the Figures, below.

FIG. 1A shows an example computing environment 100 that includes a primary site and a recovery site, with a particular focus on components of primary site 110. (The recovery site will be discussed in more detail in conjunction with FIG. 1B, below.) In one embodiment, primary site 110 is configured as a cloud network including components such as those depicted in FIG. 1A and discussed in more detail below. In other embodiments, primary site 110 may be configured in other ways. As can be seen in FIG. 1A, primary site 110 includes one or more servers, such as servers 120(1)-(*x*) (collectively, "server(s) 120"). Each server 120 can be any computer or computer system that is capable of functioning as a server, including a desktop or other stand-alone computer, a workstation, a media server, and so forth. Although not expressly shown in FIG. 1A (or FIG. 1B), in one embodiment, servers are communicatively coupled to each other via a cloud (or similar) computing network. As such, although each server 120 is depicted in FIG. 1A as only being directly connected to the server(s) immediately to either side of it (for the sake of simplicity in the drawings), in practice each server may be communicatively coupled to any other server in its respective cloud. As such, each server 120 may be joined to any other server 120 via one or more connections or networks, including other servers, routers, switches, or other networking components, and so forth.

Primary site 110 also includes one or more virtual machines ("VMs"), such as virtual machines 130(1)-($v$) (collectively, "virtual machine(s) 130" or "VM(s) 130"). In one embodiment, virtual machines 130 are part of a cloud computing environment. In other embodiments, virtual machines 130 can be organized and connected in different manners. In the specific example shown in FIG. 1A, virtual machines 130 are each hosted on one of servers 120. In other embodiments, and regardless of the specific organizational structure of the virtual machines, each virtual machine can be hosted on other computing devices, such as a desktop or other stand-alone computer, a workstation, or any other computing device that is capable of hosting a virtual machine. Although not expressly depicted in FIG. 1A, each server 120 typically comprises and uses a host operating system, and a hypervisor (or a virtual machine monitor or other similar software) can run on top of the host operating system. In turn, each hypervisor can host one or more of virtual machines 130, and each instance of a virtual machine 130 executes a guest operating system. As shown in FIG. 1A, each server 120 may host a different number of virtual machines 130 than any other server 120. In practice, many other configurations are possible other than the specific configurations shown herein. For instance, at any given moment, each server 120 can host as few as zero virtual machines 130, or as many virtual machines 130 as that server has the resources to operate at that time. There is no requirement that any server 120 hosts the same number of virtual machines 130 as are hosted by any other server 120, although it is certainly possible for two or more servers 120 to host the same number of virtual machines 130 as each other at any given time.

As is also shown in FIG. 1A, each server 120 is connected to a datastore 140. Although depicted as a single, shared datastore in FIG. 1A, in practice datastore 140 may include two or more distinct datastores. However, in the event that more than one datastore 140 is used in a given embodiment, each such datastore should be communicatively coupled to at least one gateway appliance, which will be discussed in more detail below. Each datastore 140 represents one or more non-transient computer readable storage mediums such as, e.g., a computer disk, flash memory, a database, or another form of computer memory (collectively, "disk(s)"). Although FIG. 1A depicts a single datastore 140 that is connected to all of the servers 120, in practice more than one datastore 140 can be connected to each server 120, and more than one server 120 can be connected to each datastore 140 (if multiple datastores 140 are being used in any given embodiment).

Regardless of the specific form of storage used, each datastore 140 is capable of storing data or other information (collectively, "data") in a non-volatile manner, and is actually used in conjunction with this disclosure to store data in such a manner. More specifically, datastore 140 can store one or more disks, such as disks 145(1)-145($z$) (collectively, "disks 145"). Each disk 145 can take the form of a VMDK, a VHD, or any other virtual disk image file format that is supported by a given hypervisor. In one embodiment, each virtual machine 130 is associated with exactly one disk 145, and each disk 145 is associated with exactly one virtual machine 130. In other embodiments, each virtual machine 130 is associated with a multiple number (e.g., 2, 3, etc.) of disks 145. Although each virtual machine 130 does not necessarily have to be associated with the same number of disks 145 as any other virtual machine 130, each virtual machine 130 should be associated with the same number of primary site disks 145 and recovery site disks 185, which will be discussed further below. Moreover, in addition to being used to store data, each datastore 140 can also be read by any server 120 connected to the associated datastore, such as is necessary for a server to read and retrieve data that is stored in that datastore.

Also depicted in FIG. 1A are gateway appliances 150(1)-($p$) (or "appliance(s) 150," for short). As shown in FIG. 1A, each appliance 150 is hosted by a server 120. As one will recognize from FIG. 1A, however, every server 120 does not necessarily have to host an appliance 150. For instance, in the particular embodiment shown in FIG. 1A, servers 120(1) and 120($x$) each host an appliance 150, but server 120(2) does not host any appliances. In other embodiments, an appliance can be hosted by a discrete machine that is communicatively coupled to other devices and components, as necessary, on primary site 110. In practice, many other configurations are possible. For instance, in one embodiment, multiple servers 120 (and any virtual machines 130 hosted by those servers 120) can be communicatively coupled to a single appliance 150 via a network or other connection. Moreover, although only two appliances 150 are expressly depicted in FIG. 1A for the sake of space, in practice, more than two appliances can be used by a primary site in conjunction with this disclosure. Also, each appliance 150 is communicatively coupled to datastore 140, and each appliance 150 is able to read and write information from and to datastore 140, including information stored in each disk 145.

In general, an appliance typically differs from a virtual machine in that a virtual machine will commonly be more robust, and will usually contain more functionality than is typically the case with an appliance. However, in certain embodiments, an appliance may be equivalent to or substantially equivalent to a virtual machine. In one embodiment, appliances 150 can each be a virtual machine image file consisting of a pre-configured operating system environment and a single application, as well as any functionality needed to interface with various datastores, such as datastores 140. Appliances 150 will each typically include software that allows each appliance 150 to communicate with an associated appliance on the recovery site, such as through a network or other connection. (This will be discussed in more detail in conjunction with FIG. 1C, below.) In certain embodiments, an appliance can also be a stand-alone computing system configured to perform operations and provide other functionality described herein. Moreover, in certain embodiments, each appliance 150 can include more, less, or different components that are expressly described here. However, regardless of the exact specifications of any given appliance, and similar to the situation with virtual machines 130, each appliance 150 can be hosted on any computing device, such as a server, a desktop or other stand-alone computer, a workstation, a media server, or any other computing device that is capable of hosting an appliance, such as those described in more detail herein.

Figure 1B:
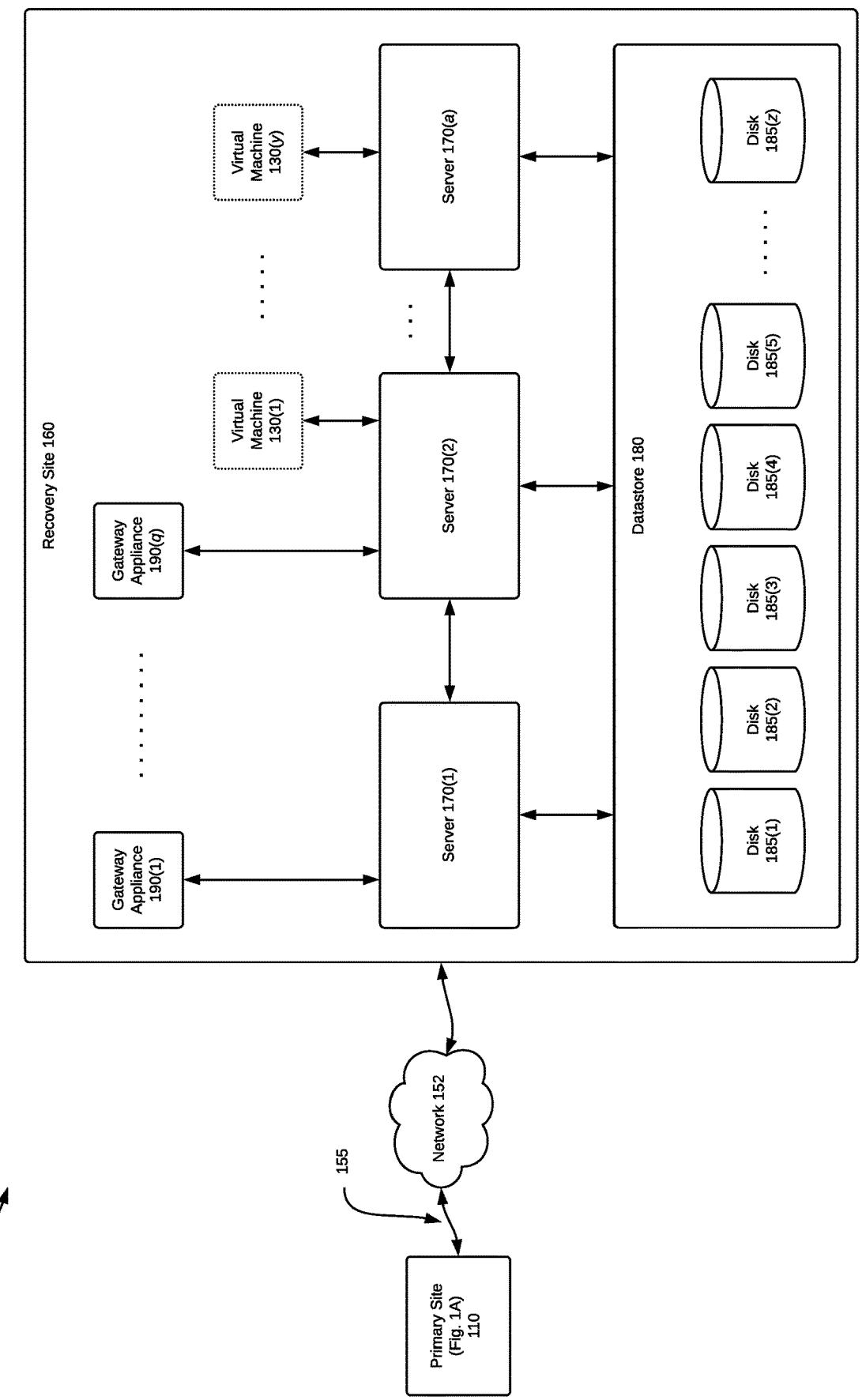
FIG. 1B is a block diagram depicting an example computing environment, and particularly an example recovery site and the connections thereto, according to one embodiment of this disclosure.

As can be seen in FIG. 1A, the entire primary site 110 is either directly or indirectly connected to a network 152 via one or more connections 155, which components in turn connect primary site 110 to recovery site 160. Network 150 can be any sort of network, including a local area network ("LAN"), wide area network ("WAN"), storage area network ("SAN"), the Internet, an intranet, and so forth. Although only one network 150 is depicted in FIGS. 1A and 1B, in practice additional networks 150 can be communicatively coupled or otherwise used in conjunction with this disclosure. The reader will appreciate that, for the sake of space, only certain of the connections are specifically labeled with the number 152, and that more or less connections may be used in any given environment. Each connection 152 can be any sort of wired and/or wireless network connection, such as an Ethernet connection, a Fiber Optic connection, a BLUETOOTH connection, and so forth, including various combinations of the foregoing technologies. Through the various connections and networks, primary site 110 (including appliances 150 and any virtual machines 130 that are being hosted on primary site 110 at any given time) is ultimately connected to recovery site 170 (including the components thereof, which will be discussed in more detail in conjunction with the discussion of FIG. 1B, below).

FIG. 1B shows additional details of example computing environment 100, with a particular focus on components of recovery site 160. (The components of primary site 110 were discussed in more detail in conjunction with FIG. 1A, above.) In one embodiment, recovery site 160 is configured as a cloud network including components such as those depicted in FIG. 1B and discussed in more detail below. In other embodiments, recovery site 160 may be configured in other ways. As can be seen in FIG. 1B, recovery site 160 includes one or more servers, such as servers 170(1)-(a) (collectively, "server(s) 170"). Each server 170 can be any computer or computer system that is capable of functioning as a server, including a desktop or other stand-alone computer, a workstation, a media server, and so forth. Although not expressly shown in FIG. 1B (or FIG. 1A), in one embodiment, servers are communicatively coupled to each other via a cloud (or similar) computing network. As such, although each server 170 is depicted in FIG. 1B as only being directly connected to the server(s) immediately to either side of it (for the sake of simplicity in the drawings), in practice each server may be communicatively coupled to any other server in its respective cloud. As such, each server 170 may be joined to any other server 170 via one or more connections or networks, including other servers, routers, switches, or other networking components, and so forth.

Further to the above, the reader should recognize that there is not necessarily any meaningful difference between servers 120 and servers 170, except for the numbering provided herein. Indeed, each group of servers is labeled with distinct numbers herein in order to facilitate clarity of discussion herein, not because there is necessarily a difference between servers 120 and servers 170 in and of themselves. Of course, however, nothing in this disclosure is meant to imply that servers 120 are or must be identical to servers 170, or even that any one of servers 120 is or must be identical to any other of servers 120 (and likewise for servers 170).

As depicted in part by the dashed lines around virtual machines 130(1) and 130(y), recovery site 160 is capable of hosting one or more virtual machines, but will not necessarily always do so. Rather, a virtual machine will typically only be transferred (or "failed over") to recovery site 160 if a related virtual machine 130 fails (or is otherwise taken down, disconnected from the network, and so forth) on primary site 110. To that end, FIG. 1B depicts virtual machines 130(1) and 130(y) as examples of virtual machines that could potentially be hosted on the servers of recovery site 160. However, as is shown in part by the dashed borders of virtual machines 130(1) and 130(y), these virtual machines will not necessarily always be operating on recovery site 160, and typically will not be present when recovery site 160 is first put into operation. Moreover, in other embodiments and at other times, each server 170 may host more or less than the number of virtual machines 130 depicted with dashed borders in FIG. 1B. Additionally, server 170(1) can also host one or more virtual machines 130, even though no such virtual machines are expressly depicted as being hosted by server 170(1) in FIG. 1B. The specifics of virtual machines 130 that can be hosted on recovery site 160 are substantially the same as the specifics of virtual 130 that are typically hosted on primary site 110, including the connections related thereto and other components related thereto (e.g., a host operating system, a hypervisor, a guest operating system, and so forth), and therefore will not be discussed in any further detail in those regards at this point.

As is also shown in FIG. 1B, each server 170 is connected to a datastore 180. Although depicted as a single, shared datastore in FIG. 1B, in practice datastore 180 may include two or more distinct datastores. However, in the event that more than one datastore 180 is used in a given embodiment, each such datastore should be communicatively coupled to at least one gateway appliance. Moreover, although FIG. 1B depicts a single datastore 180 that is connected to all of the servers 170, in practice more than one datastore 180 can be connected to each server 170, and more than one server 170 can be connected to each datastore 180 (if multiple datastores 180 are being used in any given embodiment). Datastore 180 is substantially the same as datastore 140.

Moreover, as was the case with datastore 140, datastore 180 can store or more disks, such as disks 185(1)-185(z) (collectively, "disks 185"). Each disk 185 can take the form of a VMDK, a VHD, or any other virtual disk image file format that is supported by a given hypervisor. In one embodiment, each virtual machine 130 is associated with exactly one disk 185 on the recovery site, where that disk serves as a replica of the primary site disk 145 that is associated with the same virtual machine 130. In other embodiments, each virtual machine 130 can associated with a multiple number (e.g., 2, 3, etc.) of disks 185. Although each virtual machine 130 does not necessarily have to be associated with the same number of disks 185 as any other virtual machine 130, each virtual machine 130 should be associated with the same number of primary site disks 145 and recovery site disks 185.

As was the case with servers 120 and servers 170, discussed above, there is not necessarily any meaningful difference between datastores 140 and datastores 180, except for the numbering provided herein. Indeed, each group of datastores is labeled with distinct numbers herein in order to facilitate clarity of discussion herein, not because there is necessarily a difference between datastores 140 and datastores 180. Of course, however, this also is not meant to imply that datastores 140 are or must be identical to datastores 180, or, in the situation where more than one datastore is employed at any given time, even that any one of datastores 140 is or must be identical to any other of datastores 140 (and likewise for datastores 180). However, there will typically be the same number z of disks 145 as there are of disks 185. Thus, in this particular instance, and within any given implementation put into practice, z will typically have the same value with respect to disks 145 as z has with respect to disks 185. Nevertheless, the value of z (i.e., the number of disks on each of the primary site and recovery site) can change from one implementation to the next, or even during the execution of an embodiment of this disclosure. This functionality will be explained in additional detail in conjunction with the discussion of the other figures, below.

Also depicted in FIG. 1B are gateway appliances 190(1)-(q) (or "appliance(s) 190," for short). As shown in FIG. 1B, each appliance 190 is hosted by a server 170. Similar to the discussion of FIG. 1A, however, every server 170 does not necessarily have to host an appliance 190. For instance, in the particular embodiment shown in FIG. 1B, servers 170(1) and 170(2) each host an appliance 190, but server 170(a) does not host any appliances. In other embodiments, an appliance can be hosted by a discrete machine that is communicatively coupled to other devices and components, as necessary, on recovery site 160. In practice, many other configurations are possible. For instance, in one embodiment, multiple servers 170 (and any virtual machines 130 hosted by those servers 170) can be communicatively coupled to a single appliance 190 via a network or other connection. Moreover, although only two appliances 190 are expressly depicted in FIG. 1B for the sake of space, in practice, more than two appliances can be used by a recovery site in conjunction with this disclosure.

As was the case with other components described above, the reader should recognize that there is not necessarily any meaningful difference between appliances 150 and appliances 190, except for the numbering provided herein. Indeed, each group of servers is labeled with distinct numbers herein in order to facilitate clarity of discussion herein, not because there is necessarily a difference between appliances 150 and appliances 190 in and of themselves. Of course, however, this also is not meant to imply that appliances 150 are or must be identical to appliances 190, or even that any one of appliances 150 is or must be identical to any other of appliances 150 (and likewise for appliances 150).

As used throughout this disclosure, letters such as a, p, q, x, y, and z are used to indicate a variable number of devices or components. These letters are used to indicate a variable number of instances of various devices and components, and as such, the value of each of these letter may vary from implementation to implementation of this system. However, where a given letter is used in conjunction with two different components (e.g., disks 145(z) and disks 185(z)), that letter should typically have the same value with respect to each of those components within a given implementation of the systems and methods described herein. Thus, for example, if z=52 in any given implementation, then the reader should understand that that implementation will include fifty-two disks 145 and fifty-two disks 185. However, while the foregoing will typically be the case, it need not always be the case, as either the primary site or the recovery site could have more than "z" disks in any given implementation without hindering the ability to perform the methods put forth herein in conjunction with the example systems described here. Moreover, although two different variables (e.g., x and y) do not have to have the same value as each other within a given implementation, nothing in this disclosure should be read as necessarily requiring any two different variables (e.g., x and y) to have different values from each other within any given implementation, and any variable can indeed have the same value as any other variable within any given implementation.

As can be seen in FIG. 1B, the entire recovery site 160 is either directly or indirectly connected to a network 152 via one or more connections 155, which components in turn connects recovery site 160 to primary site 110. Network 152 can be any sort of network, examples of which are provided above. Although only one network 152 is depicted in FIGS. 1A and 1B, in practice additional networks 152 can be communicatively coupled or otherwise used in conjunction with this disclosure. The reader will appreciate that, for the sake of space, only certain of the connections (examples of which are also provided above) are specifically labeled with the number 155, and that more or less connections may be used in any given environment. Through the various connections and networks, recovery site 160 (including appliances 190 and any virtual machines 130 being hosted on recovery site 160 at any given time) is ultimately connected to primary site 110 (including appliances 150 and any virtual machines 130 being hosted on recovery site 110 at any given time), components of which were shown in more detail in FIG. 1A.

Figure 1C:
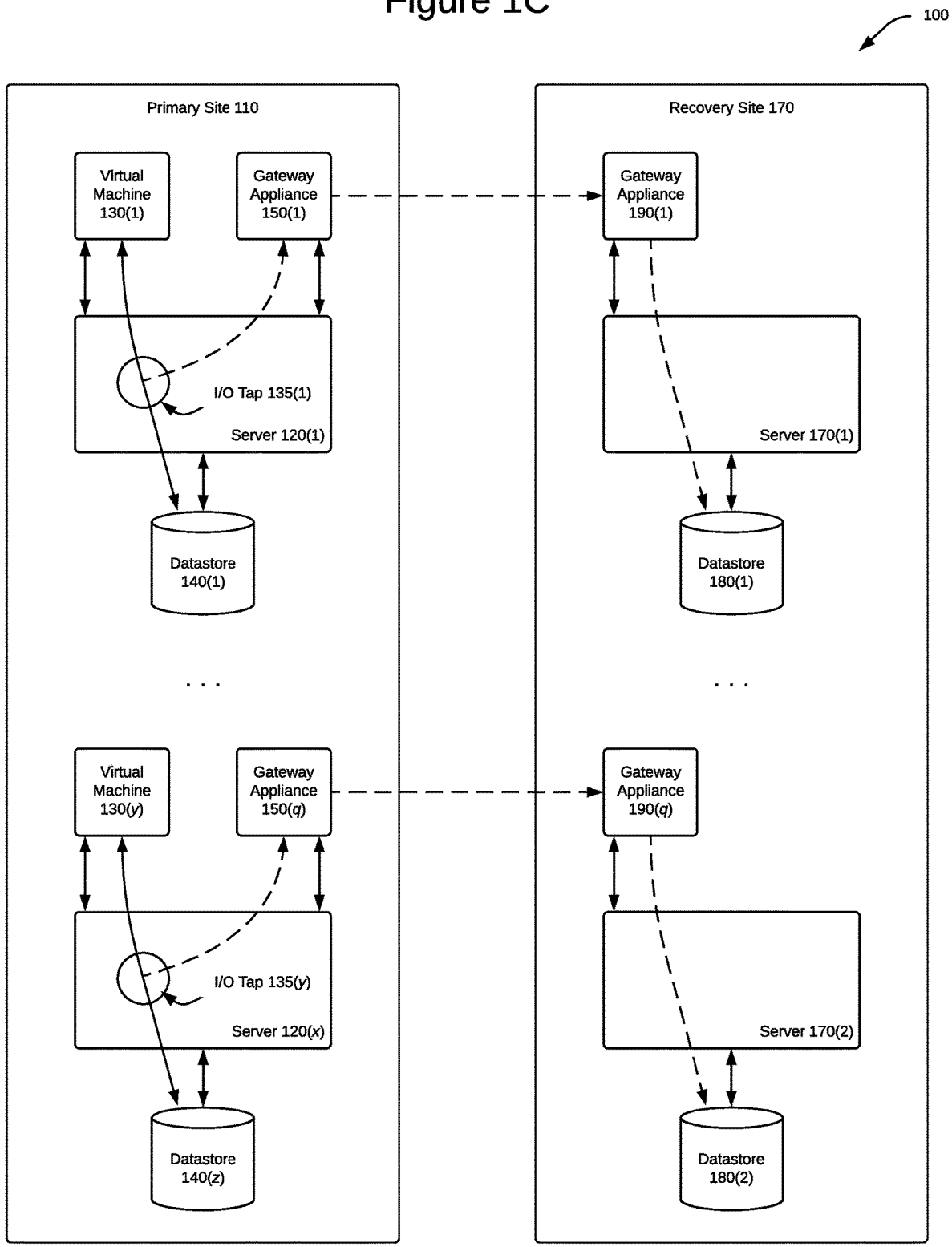
FIG. 1C is a block diagram that provides additional details of certain components of the primary site and recovery site, according to one embodiment of this disclosure.

FIG. 1C provides enhanced details of certain components that are used to perform replication, such as the replication of step 310 below, including I/O tap operations and related components and functionality that are used to transfer data from primary site 110 to recovery site 170. As the reader will appreciate, FIG. 1C only depicts certain components of primary site 110 and recovery site 160, such as are necessary for the explanation provided herewith, but does not expressly show other components that are not necessary to this portion of the explanation, including certain of the components discussed in more detail above. As the reader will appreciate, however, the "enhanced" view of the specific components provided herein does not in any way negate or eliminate or otherwise remove the other components that are discussed above with respect to primary site 110, and recovery site 160, respectively, including the network(s) 152 and connections 155 connecting those sites to each other.

As is shown in FIG. 1C, virtual machine 130(1) and gateway appliance 150(1) are both connected to server 120(1), which in turn is connected to datastore 140, all of which can also be seen in FIG. 1A. This group of components is then communicatively coupled with associated components on recovery site 160, via the connection between appliance 150(1) and appliance 190(1). Appliance 190(1) is then connected to server 170(1), which in turn is connected to datastore 180, all of which can also be seen in FIG. 1B.

Similarly, FIG. 1C depicts virtual machine 130(y) and gateway appliance 150(p), which are both connected to server 120(x), which in turn is connected to datastore 140, all of which can also be seen in FIG. 1A. This group of components is then communicatively coupled with associated components on recovery site 160, via the connection between appliance 150(p) and appliance 190(q). Appliance 190(q) is then connected to server 170(2), which in turn is connected to datastore 180, all of which can also be seen in FIG. 1B.

In practice, of course, the primary site will typically include additional servers, virtual machines, and datastores, such as those shown in FIG. 1A; and the recovery site will typically also include at least additional servers and datastores, with the potential of hosting one or more virtual machines as required at any given time, such as is shown in FIG. 1B.

Additionally, FIG. 1C also shows I/O taps 135(1)-(y). The reader will notice that primary site 110 includes a variable number y of virtual machines 130 and a variable number that is also y of I/O taps 135. This is intentional, and is meant to indicate that a given primary site 110 will typically have the same number of I/O taps 135 as virtual machines 130. This is the case because each virtual machine 130 will typically require its own I/O tap 135, thereby resulting in a typical scenario in which there are the same number of I/O taps 135 as there are virtual machines 130. However, this equivalence does not necessarily have to be present in every embodiment of this disclosure in order for the systems and methods described herein to operate properly. In any event, I/O taps 135 are used to intercept, or "tap," the data stream flowing from any given virtual machine to the datastore associated with that virtual machine. I/O taps 135 are typically software components, or modules, that are configured to perform the functionality required of an I/O tap in conjunction with this disclosure, and as described herein. In one embodiment, I/O taps 135 can be a VERITAS I/O TAP (VXTAPP) module. In other embodiments, other types of I/O taps can be used.

As shown by the broken lines in FIG. 1C, as the data is read from the data stream between any given virtual machine and a datastore associated with that virtual machine, copies of (and/or other information about) the replicated data will be transmitted to the appliance most directly associated with that virtual machine. For instance, data that is being written by virtual machine 135(1), and which is intercepted by I/O tap 135(1), will be transmitted to appliance 150(1). Similarly, data that is being written by virtual machine 135(y), and which is intercepted by I/O tap 135(y), will be transmitted to appliance 150(p). As the reader will appreciate, more than one virtual machine, I/O tap, and/or datastore can be associated with each appliance 150. Moreover, appliances 150 do not necessarily have to be hosted on the same server that hosts the virtual machine with which that appliance is associated. Likewise, appliances 150 do not necessarily have to be hosted on the same server to which a given datastore is connected, or upon which a given I/O tap is being executed.

In any event, once the tapped data is transmitted to the associated appliance on the primary site, that appliance will then transmit that data to the appliance on the recovery site with which the appliance on the primary site is communicatively coupled. Thus, for instance, in the example embodiment depicted in FIG. 1C, appliance 150(1) would communicate any data that it receives to appliance 190(1), and appliance 150(p) would communicate any data that it receives to appliance 190(i). Upon receiving this data, each appliance 190 on the recovery site will in turn transmit that data to the associated datastore, as shown, for example, in FIG. 1C, as part of the replication process of step 310, which is discussed in more detail below. Although not expressly shown in FIG. 1C, the receiving datastore will then write the data (or cause the data to be written) to a specific disk (such as one of disks 185) that is associated with the virtual machine that originally generated the data that is now being written via a replication process.

Although FIG. 1C only depicts I/O taps on two of virtual machine 130, in practice, an I/O tap will typically be included on each virtual machine being hosted on the primary site. Each of those I/O taps will then transmit copies of (and/or other information about) the intercepted data to their associated appliance, which will then proceed to forward the data to the recovery site, such as, e.g., in the general manner described above. Moreover, although not expressly depicted in FIG. 1C, the reader will appreciate that the data will be transmitted between each of appliances 150 and each associated appliance 190 via one or more network(s) 152 and connections 155, such as are shown in FIGS. 1A and 1B. The reader will appreciate that the emphasis here is on the flow of the data from I/O taps 135 to the associated destination datastore 180 on the recovery site, not on the specific network architecture used to transmit that data, except as expressly noted in FIG. 1C and the discussion provided herein.

Figure 2:
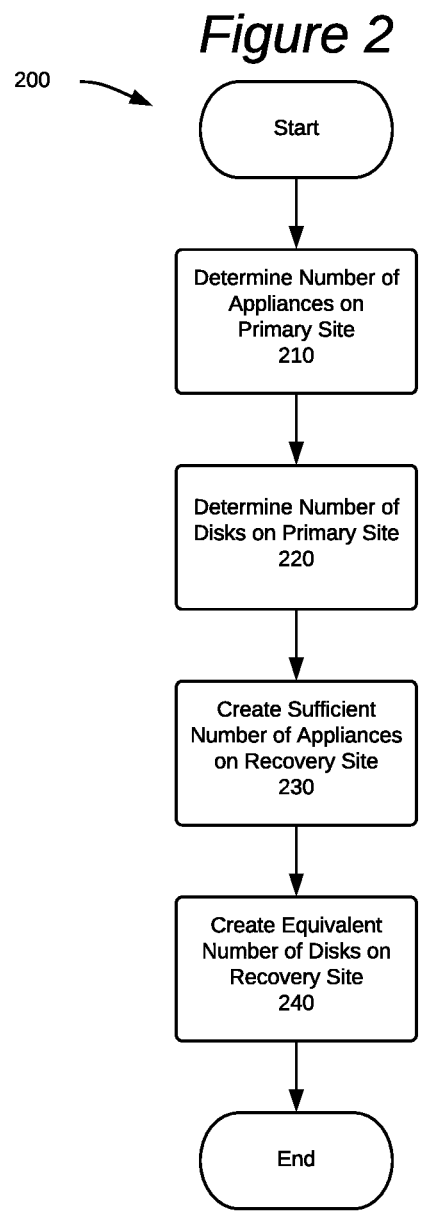
FIG. 2 is a flowchart depicting various actions that can be performed to set up a replication environment, according to one embodiment of this disclosure.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIGS. 1A, 1B, and 1C.

The general substance of method 200 was largely discussed above, in conjunction with the discussion of FIGS. 1A, 1B, and 1C. Therefore, a fairly brief treatment will be given here. Nevertheless, a brief overview and discussion of the set up method should be helpful here, particularly with respect to understanding the relationship between the various components on the primary site and the various components on the recovery site. As a practitioner will recognize, many other steps are required to set up a functioning network. Method 200 should not be taken as discounting any such steps, but rather, as highlighting the specific steps that are necessary for an understanding of the other methods and functionality discussed herein.

Subject to the above, method 200 begins at 210, where method 200 determines or is used to determine the number of appliances (such as appliances 150) on a primary site (such as primary site 110). Thus, in the example provided in FIGS. 1A and 1C, method 200 will determine that p number of appliances are present on primary site 110. At 220, method 200 either determines or is used to determine the number of disks on a primary site (such as primary site 110). Thus, in the example provided in FIGS. 1A and 1C, method 200 will determine that z number of disks are present on primary site 110. As indicated elsewhere herein, p and z are both whole number integers that represent variable values. Within any given implementation of the systems and methods described herein, p and z do not necessarily have to have the same value as each other, although they can. For instance, in one common embodiment, each virtual machine 130 on the primary site is associated with a specific disk 145 on the primary site, and will in turn be associated with a specific disk 185 on the recovery site, thus resulting in the same number of virtual machines 130, disks 145, and disks 185. In other embodiments, each virtual machine 130 will be associated with a given multiple (e.g., 2, 3, etc.) of specific disks on the primary site, in which case each disk 145 and 185 can be viewed as representing that multiple number of disks. For instance, in one embodiment, each virtual machine 130 on the primary is associated with two specific disks 145 on the primary site, and in turn will be associated with two specific disks 185 on the recovery site. As the reader will also appreciate, steps 210 and 220 can be performed in either order, and can also be performed simultaneously or substantially simultaneously to each other.

As the reader will appreciate, step 210 is typically performed before 230, since step 230 makes use of the information gathered in step 210 regarding the number of appliances on the primary site. However, step 220 does not necessarily have to be performed prior to step 230. In any event, at some point after the number of appliances on the primary site is determined in 210, method 200 will create or be used to create an equivalent number of appliances (such as appliances 190) on a recovery site (such as recovery site 160). Continuing with the example from above, method 200 would create or used to be create a sufficient number of appliances on the recovery site in step 230. Thus, although there may be the same number of appliances on the primary site as there are appliances on the recovery site, in other instances a different number of appliances may be in operation on site as compared to the other.

As the reader will also appreciate, step 220 is typically performed before 240, since step 240 makes use of the information gathered in step 220 regarding the number of disks on the primary site. However, steps 210 and 230 do not necessarily have to be performed prior to step 240. In any event, at some point after the number of disks on the primary site is determined in 220, method 200 will create or be used to create an equivalent number of disks on a recovery site (such as recovery site 160). Continuing with the example from above, since method 200 would determine that there are z number of disks on the primary site in step 220, method 200 would create or used to be create z number of disks on the recovery site in step 240. Thus, as noted in the discussion above, there will typically be the same number z of appliances on the primary site as there are appliances on the recovery site, although this is not necessarily required.

Figure 3:
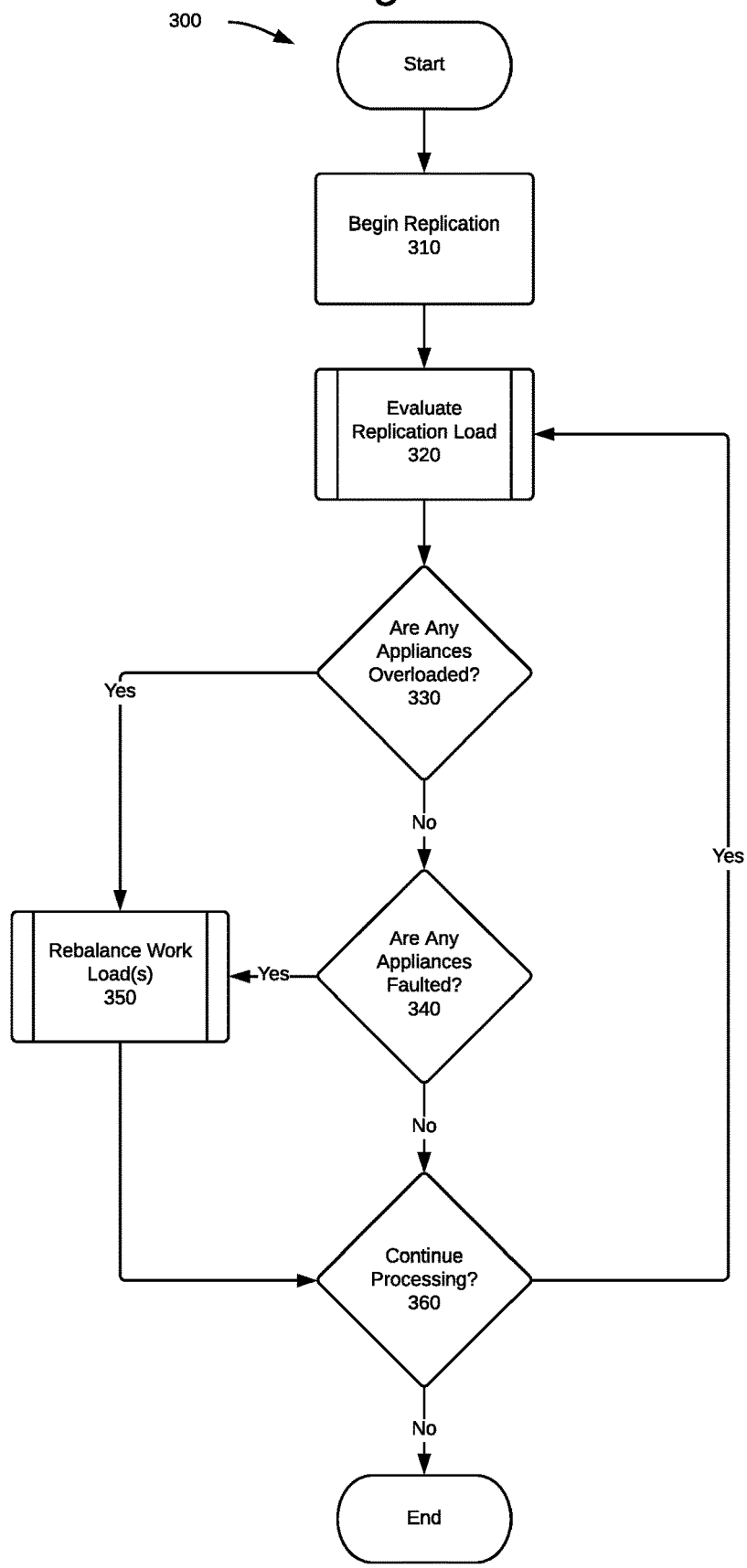
FIG. 3 is a flowchart depicting various actions that can be performed in relation to rebalancing the workload of virtual appliances, according to one embodiment of this disclosure.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIGS. 1A, 1B, and 1C. In one embodiment, one or more steps of method 300 are performed by appliance(s), such as appliance(s) 150 or 190, and/or an I/O tap module(s), such as one or more of I/O tap(s) 135.

Prior to performing the steps of method 300, the replication environment will typically have been set up, such as in the manner described above with respect to FIG. 2 and method 200. Method 300 begins replication at step 310. In one embodiment, the replication process uses an I/O tap (such as any of I/O taps 135) to intercept data being written by a virtual machine (such as any of virtual machines 130) to a disk (such as a disk 145) associated with that virtual machine. In other embodiments, this data can be intercepted or otherwise captured by functionality that does not directly use an I/O tap, such as by some other module or component that is configured to intercept the data stream being written by the virtual machine, and which is also communicatively coupled to the primary site appliance which that is responsible for replicating the data being transmitted in that data stream. Typically, the process of intercepting or otherwise capturing the data being written in the data stream will produce either a copy of data and/or other information describing the data, such as metadata pertaining to that data. As used herein, the copy of the data that is read or otherwise captured, along with any metadata or other information associated with that data, will generally be referred to as "read data" or "replication data."

In any event, once the replication data is captured, such as in the manner described above, that replication data is transmitted (whether by the I/O tap, or by some other component or functionality) to the appliance (such as any of appliances 150) that is associated with the virtual machine that was writing the original data. The appliance that receives this replication data on the primary site in turns transmits the replication data to an associated appliance on the recovery site, such as one of appliances 190. The appliance on the recovery site that receives this replication data then writes that replication data to an associated disk (such as any of disks 185 on the recovery site) that is associated with the virtual machine that wrote the replication data. In other embodiments, the replication of step 310 may be performed in a manner different than the manner described above, and the replication process can also include more, less, and/or different components and functionality that those that have been described herein. In any event, once the replication process is started in 310, this replication process will generally continue until the system is shut down, or until a failure occurs or until the process is otherwise interrupted for some other reason.

Moreover, the reader will note that, the replication process (and other components and functionality described herein) is/are described with respect to the normal operation of the systems and methods described herein, that is, when information is flowing primarily from production site 110 to recovery site 160. However, as the reader will recognize, certain situations may require a component or components to be "failed over" to the recovery site, such as, e.g., when a failure occurs on the primary site server that is a hosting a given virtual machine. When such a "failover" occurs, then the flow of information will typically switch directions, as recovery site 160 would effectively become the primary site for any component that was failed over to the recovery site, and once available, the original primary site would effectively become the recovery site with respect to any component that was failed over to the recovery site. In such a situation, recovery site 160 would function as the primary site with respect to that failed over virtual machine, and primary site 110 would function as the recovery site with respect to that failed over virtual machine. (However, primary site 110 may still function as the primary site with respect to other virtual machines that have been failed over, and likewise, recovery site 160 may continue to function as the recovery site with respect to those virtual machines that have not been failed over.) Thus, with respect to any virtual machines that are failed over to the recovery site, that virtual machine would write to a datastore on recovery site 160, the I/O tap would occur as part of that data stream, and replication would occur in the opposite direction of what is shown in FIG. 1C. That is, the tapped data would flow from "recovery site" 160 to "primary site" 110, and would ultimately be stored in a disk (or other portion of a datastore) on primary site 110. However, for ease of discussion, the flow of information will be discussed with respect to the flow shown in FIG. 1C, and thus under the assumption that the system is operating "normally," without any virtual machines having been failed over. In practice, the opposite flow is both likely and probable with respect to any given virtual machine(s). For the sake of providing a clear discussion, however, such nuances will not be noted in any significant detail, other than stating their possibility in this paragraph.

In 320, method 300 dynamically evaluates the replication load of one or more of the appliances in real-time, e.g., while the system is already in the process of writing, reading, replicating, and storing data. Step 320 will typically evaluate the replication load of appliances on the primary site (e.g., appliances 150) as well as appliances on the recovery site (e.g., appliances 190). In certain embodiments, however, step 320 may only be performed at any given time with respect to the appliances on the primary site or the appliances on the recovery site, although not necessarily both groups of appliances at once. As noted above, this functionality can also be used to evaluate the replication load of appliances that are part of the primary site, generally speaking, but which are essentially being used as recovery appliances due to a previous failover of a virtual machine. In other embodiments, this step can be used to evaluate the replication work load of appliances on the primary site, even when they are functioning normally (e.g., when data is flowing in the direction shown in FIG. 1C).

The evaluation of 320 will typically occur after replication has begun, such as, e.g., by performing step 310. In certain embodiments, this evaluation may occur, at least in part, even prior to beginning replication, which is possible where this evaluation is based, either in whole or in part, on historical data or other predictive functionality (e.g., a general knowledge that "Black Friday" will typically generate increased traffic for an ecommerce website, even if no actual historic data exists for that site). As will be discussed in more detail below, the goal of this functionality is to ultimately determine the replication load of one or more of the appliances on the recovery site, with a particular view towards determining whether any appliances are overloaded (or are expected to become overloaded), and/or whether any appliances have access bandwidth available. The particulars of this functionality will be discussed in more detail in conjunction with FIG. 4 and method 400, below.

After evaluating the replication load of one or more appliances, method 300 will then determine if any of the evaluated appliances are overloaded in step 330. For instance, an appliance can be overloaded when that appliance is operating above a given acceptable threshold factor for one or more load evaluation factors. As an example, in one embodiment, the CPU usage of an appliance (either a standalone appliance, or the CPU usage of the server hosting the appliance) may be deemed unacceptable if the CPU usage crosses a given threshold level, such as, e.g., 80%. Additionally, an appliance can also be overloaded when the relative workload of that appliance exceeds the workload of another appliance (typically, another appliance on the same site, although this may not always be the case, e.g., in the case of a failover) by a certain factor, such as, e.g., 1.5. For instance, in one embodiment, an appliance might be considered overloaded if that appliance has a workload that is at least 1.5 times the workload of another appliance. In each of the scenarios discussed earlier in this paragraph, the specific evaluation factors or parameters to be monitored can be specified and customized, e.g., such as by an end user, by a system administrator or network administrator, or even automatically during the execution of a program performing or configured to perform the functionality disclosed herein. Likewise, the acceptable values and thresholds for any such evaluation factors or parameters, as well as the acceptable relative workload of one appliance as compared to another appliance, can also be specified in such a manner and by such a person as those mentioned in the immediately preceding sentence.

If no appliances are overloaded, then method 300 will proceed to step 340, where method 300 will determine if any appliances have faulted, in which case that appliance(s) would not be able to perform the replication activities that it would otherwise be configured to perform. A fault can occur for various reasons, such as, e.g., the appliance crashing or locking up, a network connection being disconnected or otherwise lost, or the machine upon which the appliance is hosted being powered down, among other such possibilities. If either step 330 or 340 resolve in the affirmative, then method 300 will proceed to step 350, and rebalance the workload among two or more appliances. This functionality will be discussed in more detail below, in conjunction with the discussion of FIG. 5 and method 500.

After completing 350, method 300 will proceed to 360 and determine whether to continue processing. Method 300 will also proceed to step 360 if steps 330 and 340 both resolve in the negative, in which case step 350 will not be performed in that pass through method 300. In the typical situation where 360 determines to continue processing, method 300 will then loop back to 320, where the method will once again evaluate the replication workload of one or more appliances. Although method 300 will typically continue processing in this manner, method 300 may nevertheless be configured to briefly pause before returning to step 320, in order to avoid unnecessarily consuming system resources or otherwise overloading the system. In other embodiments, method 300 can be configured to loop at certain time intervals, such as every one second, or every ten seconds, and so forth. While these time values are provided as examples for purposes of the discussion herein, in practice these time values can include any time value. In practice, this time value can be configured in advance, determined at run time, or hard coded into the program code, among other such possibilities. If step 360 determines that no further processing is needed, such as, e.g., if the entire system 100 is being shut down or replication site 160 is being taken offline for service, among other such possibilities, then method 300 will end.

Figure 4:
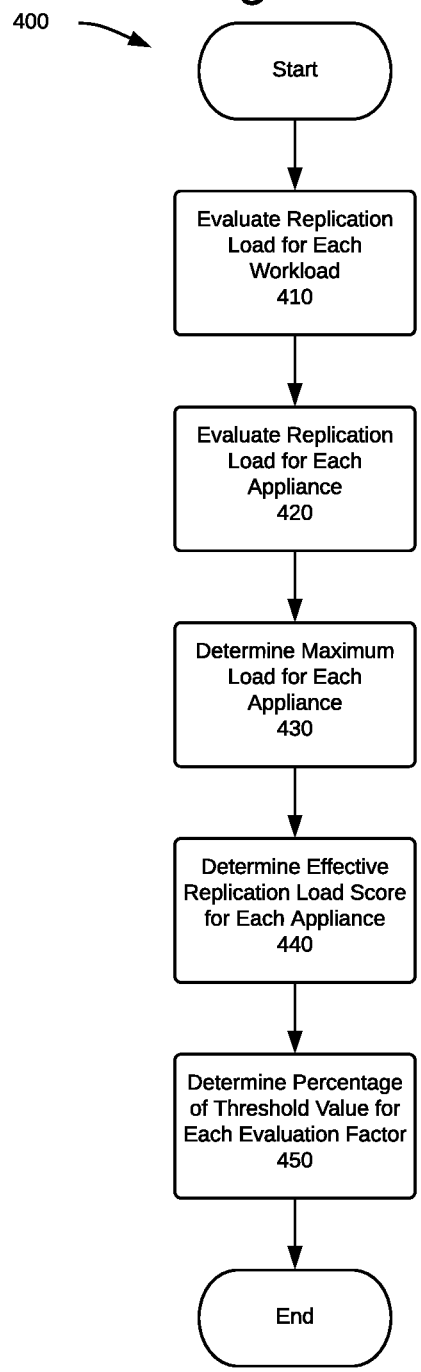
FIG. 4 is a flowchart depicting various actions that can be performed to evaluate the replication load of virtual appliances, according to one embodiment of this disclosure.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIGS. 1A, 1B, and 1C. In one embodiment, one or more steps of method 400 are performed by appliance(s), such as appliance(s) 150 or 190. In one embodiment, one or more steps of method 400 are performed by an appliance configured to operate within a resiliency architecture such as that provided by VERITAS RESILIENCY MANAGER. In other embodiments, one or more steps of method 400 are performed by an appliance configured to execute other replication software or functionality.

As will be discussed in more detail below, method 400 evaluates the replication load for a given workload in step 410, and evaluates the replication load for one or more appliances in step 420. As used herein, the term workload can be understood as the total work (e.g., replication activity) that is being performed across a given system (e.g., system 100) for a specific customer account, although other definitions of this term are also comprehended by the scope and context of this disclosure. These evaluations (as well as the evaluations of method 500, discussed below) are based, at least in part, on various possible "evaluation factors." These possible evaluation factors can include, but are not limited to, the number of disks that are associated with any given workload, the number of disks that are associated with each appliance, the current number of configurable replication units for any appliance, the maximum number of configurable replication units for any appliance, the size of the collective workload (across multiple potential customer accounts) for the datastores or disks, the size of the collective workload (across multiple potential customer accounts) for the appliances, the number of I/O operations ("IOPs") on the workloads, the number of IOPs on the appliances, the number of average unique blocks that are being replicated by the appliances at any given time, the maximum and current I/O operations on the replication appliances, the average or historic number of I/O operations on the appliances, the maximum and current CPU utilization on the appliances, the average or historic CPU utilization on the appliances, the maximum and current memory utilization on the appliances, the average or historic memory utilization on the appliances, the rate at which the blocks being replicated are sent from the appliance on the primary site and received at the appliance on the recovery site (e.g., the current network delay or congestion), the current recovery point objective (RPO) for a given customer (such as might be based, e.g., on a service level agreement, or "SLA"), the current recovery time objective (RTO) for a given customer (such as might be based, e.g., on an SLA), and the current lag time for any operations such as those described herein. Although numerous specific example evaluation factors are provided above, the specific evaluation factors that are used in any given embodiment can change from implementation to implementation, and any given implementation or embodiment can use any subset of these evaluation factors, and can also include other factors other than the specific evaluation factors listed above.

For each evaluation factor that is being considered in a given embodiment, each such evaluation factor will be assigned a "maximum limit" value and a weighted "load contribution factor." The maximum limit value will define a maximum acceptable level (or amount) for that evaluation factor with respect to any given appliance or workload. For instance, using one of the examples from above, the maximum limit value for CPU usage may be defined as 80% of the total available CPU availability. The weighted load contribution factor defines how much that evaluation factor will impact the actual load placed on any given appliance or workload. For instance, if a load will be increased twice as much with an increase in IOPs than by an increase of a second value, then the load contribution factor for IOPs would be 0.67 and the load contribution factor for the second value would be 0.33. This is obviously a simplified example for the sake of explanation. In practice, more factors can be considered and weighted against each other, thereby resulting in a more complex set of weights. Moreover, since the weights are relative rather than absolute, these weights can also be expressed as whole numbers (e.g., 67 and 33 in the above example) rather than decimal numbers, and can also be expressed in some other form so long as that form conveys the same general information.

Using criteria such as those provided above, method 400 can calculate a current "replication load score" for each of the customer workloads and each of the appliances, as shown in steps 410 and 420, respectively. In one embodiment, the current replication load score for each workload or appliance can be calculated by determining the current value of each evaluation factor in use, dividing that current value by the maximum limit value for that evaluation factor to produce a "usage quotient," and then applying the load contribution factor for that evaluation factor to weigh that usage quotient appropriately. In other embodiments, an average value (such as, e.g., the average historical value over a certain time period) can be used instead of the current value. Other calculation methods are possible as well. Regardless of the specific calculation method and values used, this process would be repeated for each evaluation factor being used, with the results of each individual calculation being added together to produce an overall current replication load score summary value for the workload or appliance being evaluated.

In addition to evaluating the current replication load for the workloads and appliances (such as, e.g., in the manner discussed above), method 400 can also determine the maximum replication load that each appliance can handle, in step 430. This maximum value can be determined by, e.g., evaluating the predetermined specifications for any given device or appliance. For instance, a given appliance may be known to be able to perform a certain number of IOPs per second, or to have a certain maximum CPU capacity. This information may be provided by a manufacturer, or may be obtained by other means. In one embodiment, the maximum replication load can be determined by calculating a maximum replication load score. This maximum replication load score can be calculated by determining the maximum value of each evaluation factor in use, dividing that current value by the maximum limit value for that evaluation factor to produce a "usage quotient" for that factor, and then applying the load contribution factor for that evaluation factor to weigh that usage quotient appropriately. As was the case for the current replication load score calculated above, this process would be repeated for each evaluation factor being used, with the results of each individual calculation being added together to produce an overall maximum replication load score for the workload or appliance being evaluated.

In 440, method 400 determines an effective replication load score for each appliance. In one embodiment, the effective replication load score can be determined by calculating a quotient or ratio by dividing the current replication load score summary value for each appliance (step 420) by the maximum replication load score for that appliance (step 430).

Finally, in 450, method 400 can determine a current threshold percentage value for each evaluation criteria being considered with respect to each appliance. For instance, for each evaluation factor on each appliance, the current threshold percentage value can be determined by dividing the average value for that evaluation factor by the maximum value for that factor, where the average and maximum values are determined in a manner such as those described above. This value can be expressed as a decimal factor (e.g., 0.67), as a percentage (e.g., 67%), or in some other suitable manner.

Figure 5:
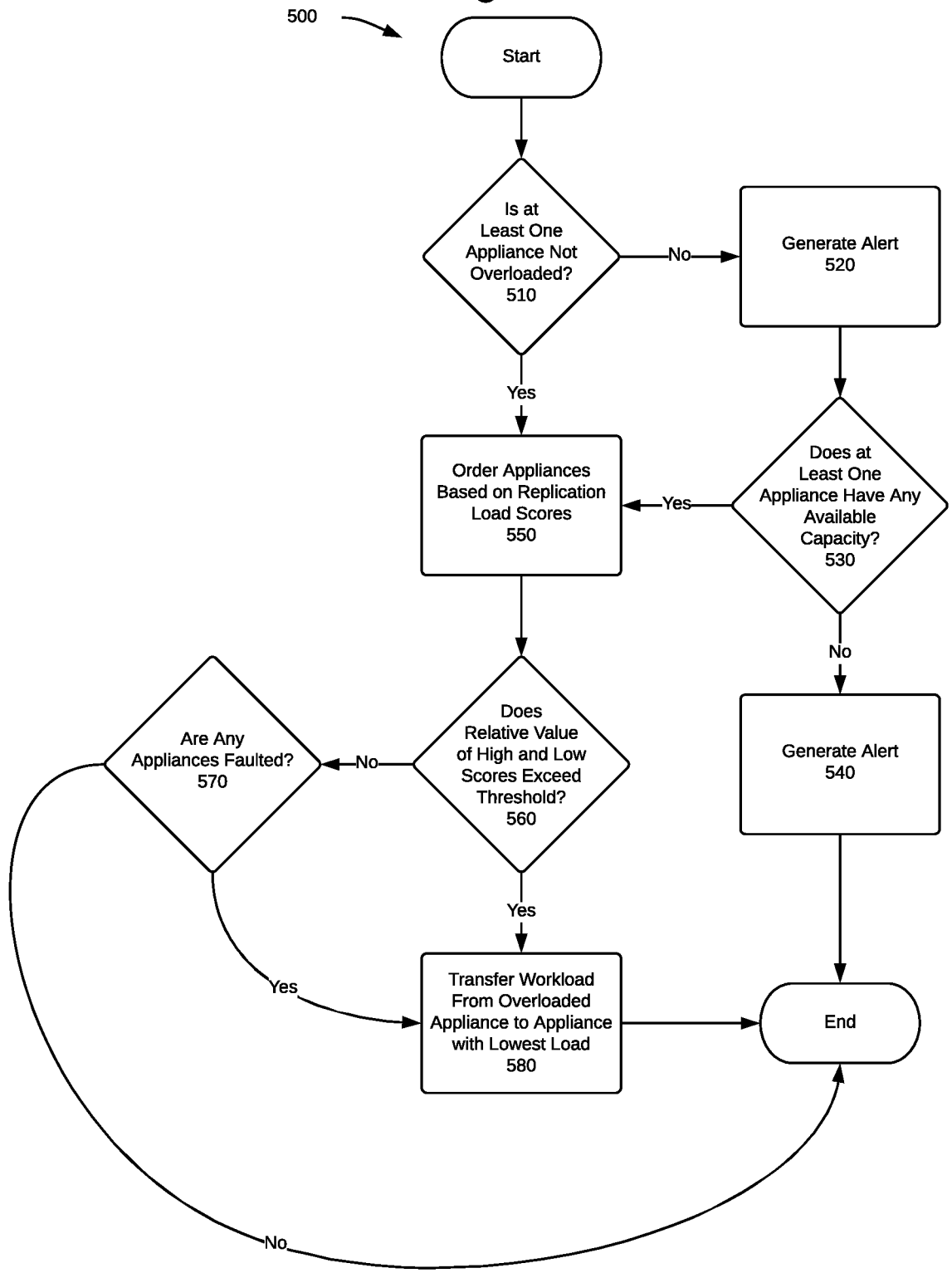
FIG. 5 is a flowchart depicting various actions that can be performed to rebalance the work load of virtual appliances, according to one embodiment of this disclosure.

FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIGS. 1A, 1B, and 1C. In one embodiment, one or more steps of method 500 are performed by appliance(s), such as appliance(s) 150 or 190. In one embodiment, one or more steps of method 500 are performed by an appliance configured to operate within a resiliency architecture such as that provided by VERITAS RESILENCY MANAGER. In other embodiments, one or more steps of method 500 are performed by an appliance configured to execute other replication software or functionality.

Method 500 begins at 510, where the method determines whether at least one appliance is not currently overloaded. If 510 determines that there are not any appliances that are not currently overloaded (e.g., all appliances are currently overloaded), method 500 then proceeds to 520 and issues an alert. This alert can take various forms, such as an email, automated text message, or computer dialog box such as in a WINDOWS computing environment. In one embodiment, this alert will be directed to a customer and will include information indicating that all of the appliances on their recovery site are currently overloaded. A user can then respond to this information in various ways, such as by adding a new appliance or taking other measures, which are beyond the scope of this disclosure. If step 520 was reached (e.g., if method 500 determined that all of the appliances were currently overloaded), method 500 then proceeds to 520 to determine if any of those appliances, even though overloaded, nevertheless have any remaining capacity available. For instance, an appliance operating at 85% of its CPU threshold may be overloaded (if the threshold limit was set to 80%, per the example used above) but may nevertheless have some capacity remaining (since 85% is still less than 100%). If this determination also evaluates in the negative (e.g., none of the appliances have any capacity remaining), then the system is overloaded and fairly drastic measures (albeit measures which are beyond the scope of this disclosure) are necessary. At this point, a second alert is generated in 540 (or a single alert is generated here, in place of the alert from 520). This alert may be similar to the alert described with respect to 520, except that the content of the alert should reflect the fact that none of the appliances have any capacity remaining. At this point, method 500 would end.

However, if either step 510 or step 530 evaluate in the affirmative (e.g., at least one device is not overloaded, per 510; or at least one device has some capacity remaining, per 530), method 500 proceeds to 550. In 550, the appliances are sorted or otherwise ordered based on their effective replication load score, such as was determined in 440. At this point, although not expressly shown in FIG. 5, method 500 can also identify the appliance with the highest load and the appliance with the lowest load, as well as their respective effective replication load scores. At 560, method 500 can determine whether the relative difference between the highest load score and the lowest load score exceeds a relative load difference threshold, such as, e.g., determining whether the highest score is at least 1.5 times as high as the lowest score. If this determination evaluates in the positive, then at least one appliance is overloaded with respect to the workload of at least one other appliance. If 560 evaluates in the negative, then method 500 determines if any appliances have been faulted in 570, in which case the workload should be rebalanced (or at least attempted to be rebalanced), even if none of the other appliances are overloaded, since at least one of the appliances is now offline and that appliance's workload should be performed by some other appliance. In practice, although multiple steps of this method can be performed in different orders than what is expressly shown in FIG. 5, the reader will recognize that steps 560 and 570 in particular can be performed in the opposite order of what is shown, and can also be performed at the same time or substantially the same time as each other. In any event, if both of these steps evaluate in the negative, then method 500 will end. However, if either of these steps evaluate in the positive, then method 500 will proceed to 580.

At 580, method 500 rebalances the various workloads by shifting a portion of the workload from one or more appliances that are overloaded, to one or more appliances on the same site (or functioning as part of the same site) that have a lower replication load score (or otherwise have available capacity). If additional unused appliances are available with respect to that site, one or more unused appliance may also be brought on line at this point, particularly (but not only) in the situation where one or more of the previously-used appliances has failed or has otherwise been taken offline. In one embodiment, method 500 can be used to determine how much of the workload should be shifted from the overloaded (or faulted) appliance(s) to other appliances that have available capacity, in order to even out (or roughly even out) the workload distribution among the appliances on that site (or among the appliances operating as part of the same site). For instance, method 500 may determine the difference in workload between the most overloaded appliance and the most underloaded appliance, and then shift one-half (or some other portion) of that workload from the most overloaded appliance to the most underloaded appliance. Method 500 then either ends, or although not expressly shown in FIG. 5, method 500 can also repeat this same basic functionality for other appliances, until the various workloads have been generally evened out and the workload of all faulted appliances have been redistributed to other online appliances.

Figure 6:
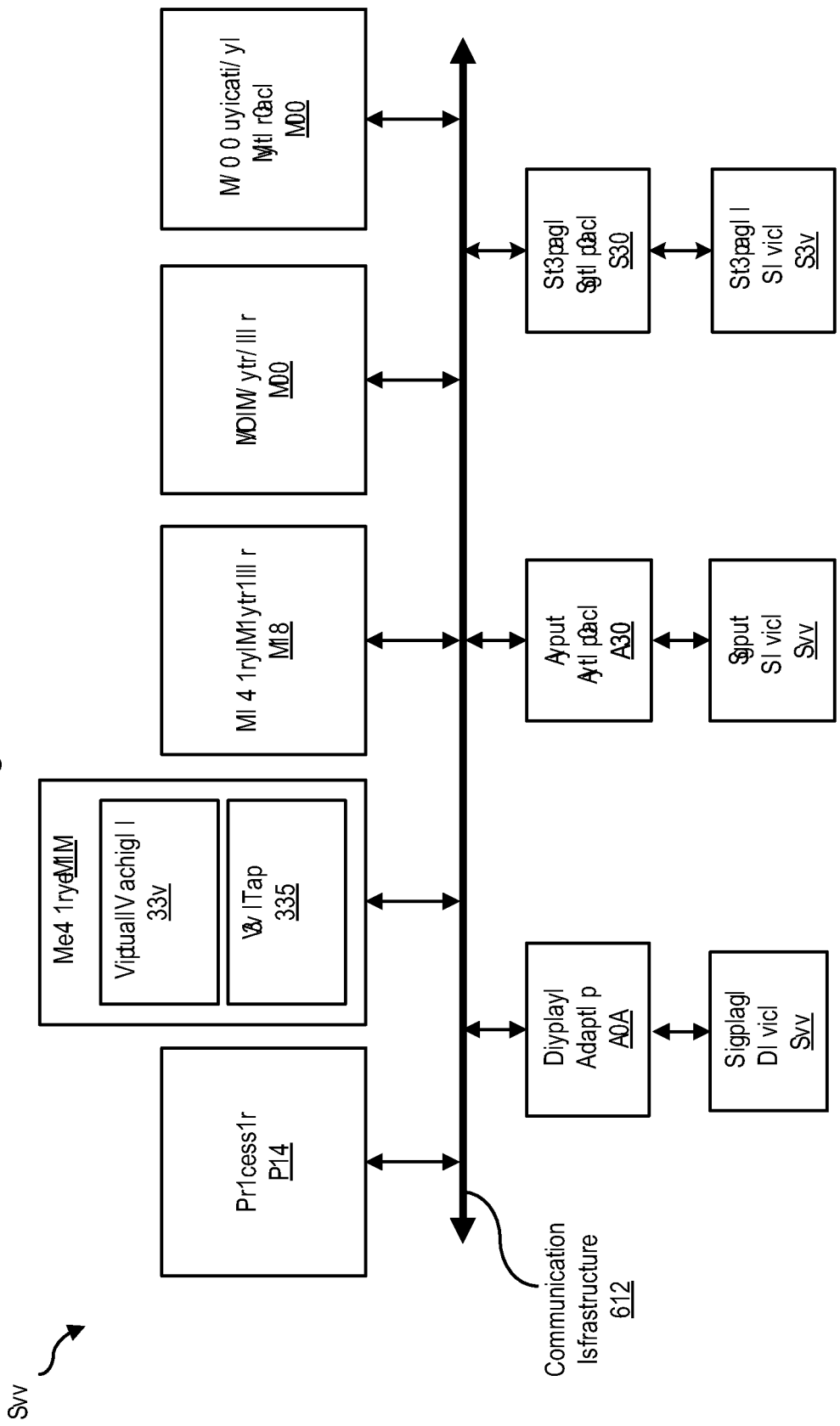
FIG. 6 is a block diagram of a computing device, illustrating how certain features of the instant disclosure can be implemented, according to one embodiment of the present disclosure.

FIG. 6 is a block diagram of a computing system 600 capable of performing one or more of the operations described above. Computing system 600 broadly represents any single or multi-processor computing device or system capable of executing computer-readable instructions. Examples of computing system 600 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 600 may include at least one processor 614 and a memory 616. By executing software that invokes, e.g., a virtual machine 130 and/or an I/O tap 135, or that causes the computing device to function as an appliance such as appliances 150 or 190, or any modifications thereof consistent with this disclosure, computing system 600 becomes a special purpose computing device that is configured to perform operations in the manner described above.

Processor 614 generally represents any type or form of processing unit capable of processing data or interpreting and executing instructions. In certain embodiments, processor 614 may receive instructions from a software application or module. These instructions may cause processor 614 to perform the functions of one or more of the embodiments described and/or illustrated herein. For example, processor 614 may perform and/or be a means for performing the operations described herein. Processor 614 may also perform and/or be a means for performing any other operations, methods, or processes described and/or illustrated herein.

Memory 616 generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 600 may include both a volatile memory unit and a non-volatile storage device. In one example, program instructions implementing on or more operations described herein may be loaded into memory 610.

In certain embodiments, computing system 600 may also include one or more components or elements in addition to processor 614 and memory 616. For example, as illustrated in FIG. 6, computing system 600 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI express (PCIe), or similar bus) and a network.

Memory controller 618 generally represents any type or form of device capable of handling memory or data or controlling communication between one or more components of computing system 600. For example, in certain embodiments memory controller 618 may control communication between processor 614, memory 616, and I/O controller 620 via communication infrastructure 612. In certain embodiments, memory controller 618 may perform and/or be a means for performing, either alone or in combination with other elements, one or more of the operations or features described and/or illustrated herein.

I/O controller 620 generally represents any type or form of module capable of coordinating and/or controlling the input and output functions of a computing device. For example, in certain embodiments I/O controller 620 may control or facilitate transfer of data between one or more elements of computing system 600, such as processor 614, memory 616, communication interface 622, display adapter 626, input interface 630, and storage interface 634.

Communication interface 622 broadly represents any type or form of communication device or adapter capable of facilitating communication between computing system 600 and one or more additional devices. For example, in certain embodiments communication interface 622 may facilitate communication between computing system 600 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 622 may also allow computing system 600 to engage in distributed or remote computing. For example, communication interface 622 may receive instructions from a remote device or send instructions to a remote device for execution.

As illustrated in FIG. 6, computing system 600 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer) for display on display device 624.

As illustrated in FIG. 6, computing system 600 may also include at least one input device 628 coupled to communication infrastructure 612 via an input interface 630. Input device 628 generally represents any type or form of input device capable of providing input, either computer or human generated, to computing system 600. Examples of input device 628 include, without limitation, a keyboard, a pointing device, a speech recognition device, or any other input device.

As illustrated in FIG. 6, computing system 600 may also include a storage device 632 coupled to communication infrastructure 612 via a storage interface 634. Storage device 632 generally represents any type or form of storage device or medium capable of storing data and/or other computer-readable instructions. For example, storage device 632 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage device 632 and other components of computing system 600. A storage device like storage device 632 can store information such as the data structures described herein, as well as one or more computer-readable programming instructions that are capable of causing a computer system to execute one or more of the operations described herein.

In certain embodiments, storage device 632 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 632 may also include other similar structures or devices for allowing computer software, data, or other computer-readable instructions to be loaded into computing system 600. For example, storage device 632 may be configured to read and write software, data, or other computer-readable information. Storage devices 632 may also be a part of computing system 600 or may be a separate device accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from that shown in FIG. 6.

Computing system 600 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 600 for storage in memory via a network such as the Internet or upon a carrier medium.

The non-transient computer-readable storage medium containing the computer programming instructions may be loaded into computing system 600. All or a portion of the computer programming instructions stored on the non-transient computer-readable storage medium may then be stored in memory 616 and/or various portions of storage device 632. When executed by processor 614, a computer program loaded into computing system 600 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 600 may be configured as an application specific integrated circuit (ASIC) adapted to implement one or more of the embodiments disclosed herein.

FIG. 7 is a block diagram of a network architecture 700 in which client systems 710, 720, and 730, and servers 740 and 745 may be coupled to a network 750. Client systems 710, 720, and 730 generally represent any type or form of computing device or system, such as computing system 600 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, one or more of client systems 710, 720, and/or 730 may include software configured to execute, e.g., a virtual machine 130 and/or an I/O tap 135, or that causes the computing device to function as an appliance such as appliances 150 or 190, and/or one or more components or threads thereof.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as Network File System (NFS), Server Message Block (SMB), or Common Internet File System (CIFS). Such storage devices can store backup information and storage configuration information, as described above.

Servers 740 and 745 may also be connected to a storage area network (SAN) fabric 780. SAN fabric 780 generally represents any type or form of computer network or architecture capable of facilitating communication between multiple storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 600 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 740(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

In some examples, all or a portion of one of the systems in FIGS. 1A, 1B, 1C, 6, and 7 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
during a replication process between a primary site and a recovery site,
for each appliance of a plurality of appliances,
evaluating a replication load of the each appliance, wherein
the recovery site comprises the plurality of appliances,
the evaluating comprises
analyzing at least a first evaluation factor for the each appliance and a second evaluation factor for the each appliance,
the first evaluation factor for the each appliance and the second evaluation factor for the each appliance are related to the replication load of the replication process on the each appliance,
the first evaluation factor is an evaluation factor for the each appliance,
the second evaluation factor is an evaluation factor for the replication load of the each appliance,
the each appliance of the plurality of appliances is a gateway appliance of a plurality of gateway appliances, and
the first evaluation factor and the second evaluation factor are ones of a plurality of evaluation factors,
determining a maximum load for the each appliance, and
determining an effective replication load score of a plurality of effective replication load scores, wherein
the effective replication load score is for the each appliance;
determining whether at least one appliance of the plurality of appliances is not overloaded based, at least in part, on the plurality of effective replication load scores; and
in response to a determination that the at least one appliance of the plurality of appliances is not overloaded,
sorting the plurality of effective replication load scores,
determining whether a relative difference exceeds a difference threshold, wherein
the relative difference is between a highest effective replication load score of the plurality of effective replication load scores and a lowest effective replication load score of the plurality of effective replication load scores, and
in response to a determination that the relative difference exceeds the difference threshold,
rebalancing one or more replication workloads between a plurality of the plurality of appliances.

2. The computer-implemented method of claim 1, wherein
the method further comprises
determining a percentage of threshold value of a plurality of percentage of threshold values for the each of the plurality of appliances.

3. The computer-implemented method of claim 2, further comprising:
applying a first weight to the first evaluation factor of the gateway appliance, and
applying a second weight to the second evaluation factor of the gateway appliance, wherein the first weight of the first evaluation factor of the gateway appliance is greater than the second weight of the second evaluation factor of the gateway appliance.

4. The computer-implemented method of claim 2, wherein
at least one of the first evaluation factor and the second evaluation factor pertains to a current replication lag time associated with the gateway appliance.

5. The computer-implemented method of claim 2, wherein
at least one of the first evaluation factor and the second evaluation factor is evaluated based on historic data pertaining to memory utilization of the gateway appliance.

6. The computer-implemented method of claim 2, wherein
at least one of the first evaluation factor and the second evaluation factor pertains to a number of average unique blocks of data directed to the gateway appliance.

7. The computer-implemented method of claim 2, wherein
determining whether at least one gateway appliance of the plurality of gateway appliances is overloaded; and
in response to a determination that at least one gateway appliance of the plurality of gateway appliances is overloaded,
performing another rebalancing operation on one or more of the plurality of gateway appliances based on one or more replication loads on one or more of the plurality of gateway appliances.

8. A system comprising:
one or more processing units, each including one or more processors and memory coupled to the one or more processors, wherein the memory stores program instructions executable by the one or more processors and the one or more processing units, alone or in combination with one another, execute the program instructions to perform a method comprising
during a replication process between a primary site and a recovery site,
for each appliance of a plurality of appliances,
evaluating a replication load of the each appliance, wherein
the recovery site comprises the plurality of appliances,
the evaluating comprises
analyzing at least a first evaluation factor for the each appliance and a second evaluation factor for the each appliance, and
the first evaluation factor for the each appliance and the second evaluation factor for the each appliance are related to the replication load of the replication process on the each appliance,
the first evaluation factor is an evaluation factor for the each appliance,
the second evaluation factor is an evaluation factor for the replication load of the each appliance,
the each appliance of the plurality of appliances is a gateway appliance of a plurality of gateway appliances, and
the first evaluation factor and the second evaluation factor are ones of a plurality of evaluation factors,
determining a maximum load for the each appliance, and determining an effective replication load score of a plurality of effective replication load scores, wherein
the effective replication load score is for the each appliance,
determining whether at least one appliance of the plurality of appliances is not overloaded based, at least in part, on the plurality of effective replication load scores, and
in response to a determination that the at least one appliance of the plurality of appliances is not overloaded,
sorting the plurality of effective replication load scores,
determining whether a relative difference exceeds a difference threshold, wherein
the relative difference is between a highest effective replication load score of the plurality of effective replication load scores and a lowest effective replication load score of the plurality of effective replication load scores, and
in response to a determination that the relative difference exceeds the difference threshold,
rebalancing one or more replication workloads between a plurality of the plurality of appliances.

9. The system of claim 8, wherein
the method further comprises
determining a percentage of threshold value of a plurality of percentage of threshold values for the each of the plurality of appliances, and
in response to a determination that the relative difference in replication load does not exceed the difference threshold,
determining whether any gateway appliances of the plurality of gateway appliances has faulted, and
in response to a determination that a gateway appliance has faulted,
performing another rebalancing operation on one or more replication workloads between two or more gateway appliances of the plurality of gateway appliances that are online, and/or bringing one or more additional gateway appliances on line as part of the plurality of gateway appliances.

10. The system of claim 8, wherein the method further comprises:
applying a first weight to the first evaluation factor of the gateway appliance, and
applying a second weight to the second evaluation factor of the gateway appliance, wherein the first weight of the first evaluation factor of the gateway appliance is greater than the second weight of the second evaluation factor of the gateway appliance.

11. The system of claim 8, wherein
at least one of the first evaluation factor and the second evaluation factor pertains to a current replication lag time associated with the gateway appliance.

12. The system of claim 8, wherein
at least one of the first evaluation factor and the second evaluation factor is evaluated based on historic data pertaining to memory utilization of the gateway appliance.

13. The system of claim 8, wherein
at least one of the first evaluation factor and the second evaluation factor pertains to a number of average unique blocks of data directed to the gateway appliance.

14. The system of claim 8, wherein the method further comprises:
determining whether at least one gateway appliance of the plurality of gateway appliances is overloaded; and
in response to a determination that at least one gateway appliance of the plurality of gateway appliances is overloaded,
performing another rebalancing operation on one or more of the plurality of gateway appliances based on one or more replication loads on the one or more of the plurality of gateway appliances.

15. A non-transitory computer-readable storage medium storing instructions executable by a processor to perform a method comprising:
during a replication process between a primary site and a recovery site,
for each appliance of a plurality of appliances,
evaluating a replication load of the each appliance, wherein
the recovery site comprises the plurality of appliances,
the evaluating comprises
analyzing at least a first evaluation factor for the each appliance and a second evaluation factor for the each appliance, and
the first evaluation factor for the each appliance and the second evaluation factor for the each appliance are related to the replication load of the replication process on the each appliance,
the first evaluation factor is an evaluation factor for the each appliance,
the second evaluation factor is an evaluation factor for the replication load of the each appliance,
the each appliance of the plurality of appliances is a gateway appliance of a plurality of gateway appliances, and
the first evaluation factor and the second evaluation factor are ones of a plurality of evaluation factors,
determining a maximum load for the each appliance, and
determining an effective replication load score of a plurality of effective replication load scores, wherein
the effective replication load score is for the each appliance;
determining whether at least one appliance of the plurality of appliances is not overloaded based, at least in part, on the plurality of effective replication load scores; and
in response to a determination that the at least one appliance of the plurality of appliances is not overloaded,
sorting the plurality of effective replication load scores,
determining whether a relative difference exceeds a difference threshold, wherein
the relative difference is between a highest effective replication load score of the plurality of effective replication load scores and a lowest effective replication load score of the plurality of effective replication load scores, and in response to a determination that the relative difference exceeds the difference threshold,
rebalancing one or more replication workloads between a plurality of the plurality of appliances.

16. The non-transitory computer-readable storage medium of claim 15, wherein
the method further comprises
determining a percentage of threshold value of a plurality of percentage of threshold values for the each of the plurality of appliances, and
in response to a determination that the relative difference in replication load does not exceed the difference threshold,
determining whether any gateway appliances of the plurality of gateway appliances has faulted, and
in response to a determination that a gateway appliance has faulted,
rebalancing one or more replication workloads between two or more gateway appliances of the plurality of gateway appliances that are online, and/or bringing one or more additional gateway appliances on line as part of the plurality of gateway appliances.

17. The non-transitory computer-readable storage medium of claim 15, wherein the method further comprises:
applying a first weight to the first evaluation factor of the gateway appliance, and
applying a second weight to the second evaluation factor of the gateway appliance, wherein the first weight of the first evaluation factor of the gateway appliance is greater than the second weight of the second evaluation factor of the gateway appliance.

18. The non-transitory computer-readable storage medium of claim 15, wherein
at least one of the first evaluation factor and the second evaluation factor pertains to a current replication lag time associated with the gateway appliance.

19. The non-transitory computer-readable storage medium of claim 15, wherein
at least one of the first evaluation factor and the second evaluation factor is evaluated based on historic data pertaining to memory utilization of the gateway appliance, and
at least one of the first evaluation factor and the second evaluation factor pertains to a number of average unique blocks of data directed to the gateway appliance.

20. The computer-implemented method of claim 2, further comprising:
in response to a determination that the relative difference in replication load does not exceed the difference threshold,
determining whether any gateway appliances of the plurality of gateway appliances has faulted, and
in response to a determination that a gateway appliance has faulted,
performing another rebalancing operation on one or more replication workloads between two or more gateway appliances of the plurality of gateway appliances that are online, and/or bringing one or more additional gateway appliances on line as part of the plurality of gateway appliances.

* * * * *